United States Patent [19]
Hussain et al.

[11] Patent Number: 5,548,561
[45] Date of Patent: Aug. 20, 1996

[54] ULTRASOUND IMAGE ENHANCEMENT USING BEAM-NULLING

[75] Inventors: Moayyed A. Hussain, Menands; Kenneth W. Rigby, Clifton Park; Koeunyi Bae, Ithaca, all of N.Y.

[73] Assignee: General Electric Company, Schenectady, N.Y.

[21] Appl. No.: 395,143

[22] Filed: Feb. 27, 1995

[51] Int. Cl.⁶ ............................ G03B 42/06; H04R 17/00
[52] U.S. Cl. .............................. 367/7; 367/87; 367/103; 367/105; 367/140; 367/153
[58] Field of Search ................................. 367/7, 87, 103, 367/105, 140, 153

[56] References Cited

U.S. PATENT DOCUMENTS 5,228,006   7/1993   Sheriff ..................................... 367/103

OTHER PUBLICATIONS

Chu, "Microwave Beam–Shaping Antennas", MIT Research Laboratory of Electronics, Techn. Rept. No. 40, Jun. 3, 1947.
Fong et al., "Method of Conjugate Gradients for Antenna Pattern Synthesis", Radio Science, vol. 6, No. 12, pp. 1123–1130, Dec. 1971.
Baird et al., "Adaptive Sidelobe Nulling Using Digitally Controlled Phase–Shifters", IEEE Trans. Antennas and Propagation, vol. AP–24, No. 5, pp. 638–649, Sep. 1976.
Giusto et al., "Phase–Only Optimization for the Generation of Wide Deterministic Nulls in the Radiation Pattern of Phased Arrays", IEEE Trans. Antennas & Propag., vol. AP–31, No. 5, pp. 814–817, Sep. 1983.
Steyskal et al., "Simple Method for Pattern Nulling by Phase Perturbation", IEEE Trans. Antennas & Propag., vol. AP–31, No. 1, pp. 163–167, Jan. 1983.
Chakraboty et al., "Beam Shaping Using Nonlinear Phase Distribution in a Uniformly Spaced Array", IEEE Trans. Antennas and Propagation, vol. AP–30, No. 5, pp. 1031–1035, Sep. 1982.
Guy, "General Radiation–Pattern Synthesis Technique for Array Antennas of Arbitrary Configuration and Element Type", IEEE Proc., vol. 135, Pt. H, No. 4, pp. 241–248, Aug. 1988.
Li et al., "Object Dependent Compensation of Missing Array Elements", 1992 IEEE Ultrasound Symposium, Oct. 1992, pp. 559–562.

*Primary Examiner*—J. Woodrow Eldred
*Attorney, Agent, or Firm*—Marvin Snyder

[57] ABSTRACT

In a digital ultrasound imaging system, artifacts due to spurious ultrasound reflections from a highly reflective object outside the region of interest are reduced in magnitude by apparatus included in the beamforming system of the digital imaging system. A null is formed in a specified direction in the ultrasound beam patterns by perturbing the time delay on each receive channel. After estimating the direction of the highly reflective, interfering object and computing a time delay perturbation using a very fast algorithm, a null approximately 10 dB deep is introduced into each beam in the direction of the interfering object. This null reduces the magnitude of artifacts in the image, thereby providing image enhancement.

11 Claims, 5 Drawing Sheets

ULTRASOUND IMAGE ENHANCEMENT USING BEAM-NULLING

FIELD OF THE INVENTION

This invention relates to digital imaging systems and, more particularly, to a method and apparatus for reducing artifacts in an ultrasound image caused by highly reflective interfering objects.

BACKGROUND OF THE INVENTION

Conventional ultrasound imaging systems comprise an array of ultrasonic transducer elements which transmit an ultrasound beam and then receive the beam reflected from the object being studied. For ultrasound imaging, the array typically has a multiplicity of transducer elements arranged in a line and driven with separate voltages. By selecting the time delay (or phase) and amplitude of the applied voltages, the individual transducer elements can be controlled to produce ultrasonic waves which combine to form a net ultrasonic wave that travels along a preferred vector direction and is focused at a selected point along the beam. Multiple firings may be used to acquire data representing the same anatomical information. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. By changing the time delay and amplitude of the applied voltages, the beam with its focal point can be moved in a plane to scan the object.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting a separate, respective time delay (and/or phase shift) and gain to the signal from each receiving transducer element.

Such scanning comprises a series of measurements in which the steered ultrasonic wave is transmitted, the system switches to receive mode after a short time interval, and the reflected ultrasonic wave is received and stored. Typically, transmission and reception are steered in the same direction during each measurement to acquire data from a series of points along an acoustic beam or scan line. The receiver is dynamically focused at a succession of ranges along the scan line as the reflected ultrasonic waves are received.

The response of an ultrasound system focused in a given direction is peaked around that direction. The response is not zero, however, for other directions. In some ultrasound images, the reflected signal coming from a given direction is contaminated or obscured by spurious reflections from a bright object, e.g., bones, in a nearby direction. Therefore it would be advantageous to adapt the response of the ultrasound imaging system to reduce artifacts caused by such interfering reflectors.

SUMMARY OF THE INVENTION

An object of the invention is to reduce the magnitude of artifacts in an ultrasound image which are due to very bright reflectors in a body being imaged without undue distortion or corruption of the image.

Another object of the invention is to introduce nulling into an ultrasonic beam in the direction of an object producing an artifact in an ultrasonic image so as to implement artifact reduction in real time.

The invention finds applicability in the field of medicine where ultrasound images produced during orthopedic and fetal examinations may contain artifacts due to very bright reflectors, such as bones. The invention may also be useful when imaging arteries with calcification present, since the calcification is also a bright reflector. The apparatus employed in achieving the reduction in artifacts can be incorporated in the beamforming system of a digital imaging system.

In the present invention, a null is formed in a specified direction in ultrasound beam patterns by perturbing the time delay on each receive channel. In many ultrasound applications, the image is distorted or corrupted near highly reflective objects. Thus, after estimating the direction of the interfering object and computing the time delay perturbation using a very fast algorithm, a null approximately 10 dB deep is introduced into each beam in the direction of the interfering object, reducing artifacts in the image and thereby enhancing the image. A beam-null processor computes the time delay perturbation required to form a wide null in the desired direction at the center frequency. These same perturbations still generate a null when applied to the whole spectrum of frequencies since a broad null for a single frequency is equivalent to a wide-band null.

Briefly, in accordance with a preferred embodiment of the invention, a method is provided for reducing, in a digital imaging system, the magnitude of an artifact in an ultrasound image wherein the artifact is caused by ultrasound reflections from a highly reflective region outside a region of interest. The method comprises activating the elements of a transducer array using transmit time delays which focus the transmitted ultrasound beams in the region of interest located at a predetermined angle and at a predetermined range from the array, forming receive beams from the reflected ultrasound received by said transducer elements using uncorrected receive time delays which focus the receive beams in the region of interest, and displaying an image of the region of interest. For an image that contains an artifact resulting from a source of interference located outside the region of interest, parameters are selected to approximate the angle and range of the source of interference, and time delay corrections are computed to form a null in a region including the approximate location of the source of interference based on said selected parameters. Corrected receive time delays are then computed as a function of the time delay corrections and the uncorrected receive time delays. The transducer elements are then activated using the transmit time delays, receive beams are formed from the reflected ultrasound received by the transducer elements using the corrected receive time delays, and an image of the region of interest derived from the receive beams formed using the corrected receive time delays is displayed, with the magnitude of the artifact resulting from the source of interference having been reduced.

The nulling method of the present invention is advantageous over methods that rely on channel amplitude shaping because it does not reduce either the transmitted power or the system gain when receiving. Because the nulling method requires the inversion of a matrix with dimensions which are small compared to the number of elements in the transducer array, it can be implemented in real time. The method is quite general and can be applied to two-dimensional arrays.

In accordance with another preferred embodiment of the invention, an ultrasound imaging system comprises an array of transducer elements, means for activating the transducer elements to transmit a beam which is focused in a region of interest, a multiplicity of receive channels connected to the transducer elements for receiving signals representing amplitude of reflected ultrasound received by the transducer elements and for forming beams from the received signals, and receive channel control means for controlling time delays and/or phase adjustments during beamforming by the receive channels. Digital control means are provided for determining time delays to be supplied to the receive channel control means for forming beams to be focused in the region of interest, and delay means are provided for displaying an image derived from the formed beams. The ultrasound imaging system is improved by the inclusion of beam-null processing means in the digital control means to enable calculation of time delay corrections which form a null in a region, outside the region of interest, which includes the approximate location of a source of interference.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENTS

Figure 1:
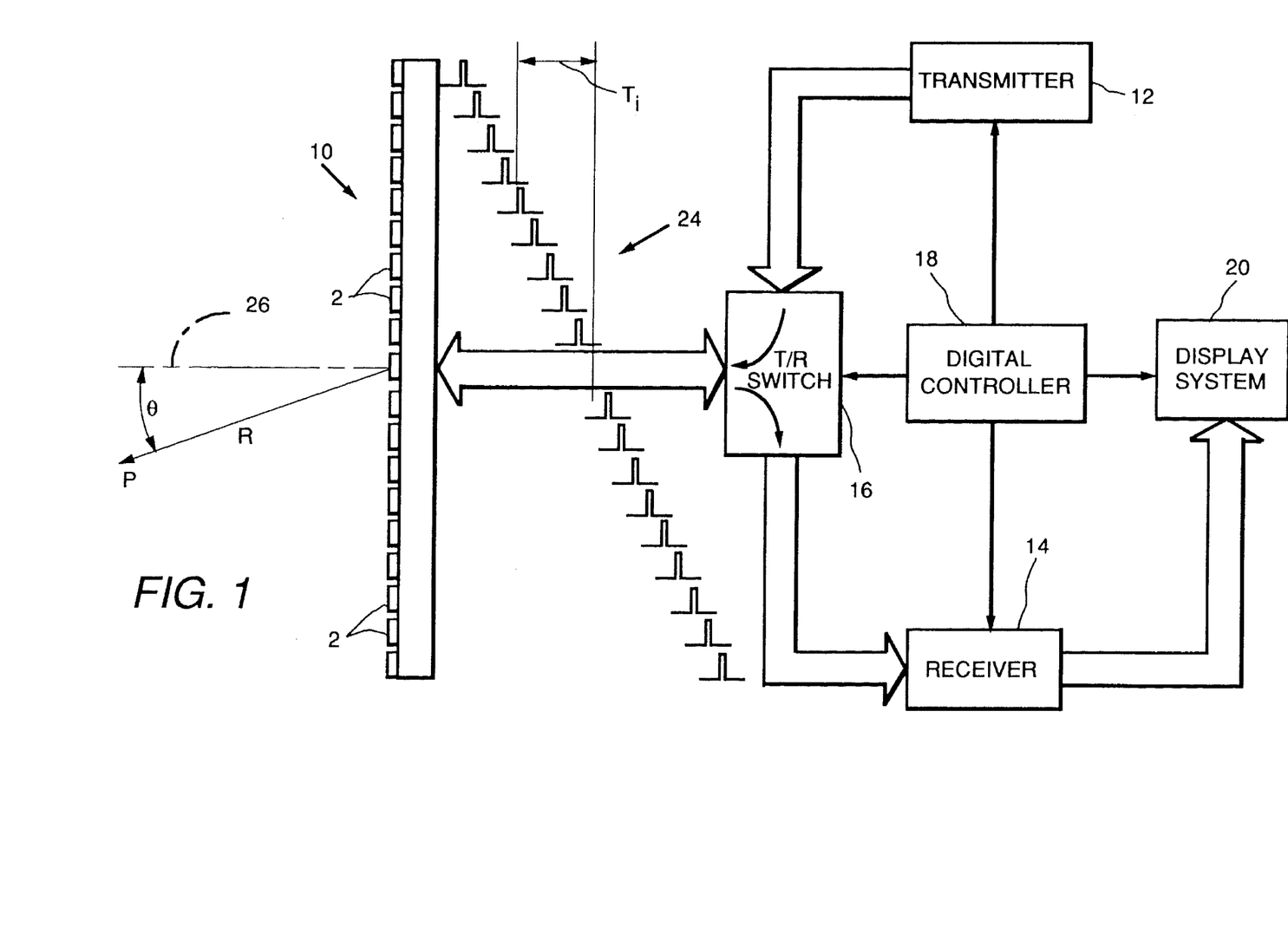
FIG. 1 is a block diagram of an ultrasonic imaging system which incorporates the present invention.

FIG. 1 illustrates the ultrasonic imaging system incorporating the invention. The system includes a transducer array 10 comprised of a plurality of separately driven transducers (or transducer elements) 2, each of which produces a burst of ultrasonic energy when energized by a pulsed waveform produced by a transmitter 12. The ultrasonic energy reflected back to transducer array 10 from the object under study is converted to an electrical signal by each receiving transducer 2 and applied separately to a receiver 14 through a set of transmit/receive (T/R) switches 16. Transmitter 12, receiver 14 and switches 16 are operated under control of a digital controller 18 responsive to commands by a human operator. A complete scan is performed by acquiring a series of echoes in which switches 16 are set to their transmit positions, transmitter 12 is gated ON momentarily to energize each transducer 2, switches 16 are then set to their receive positions, and the subsequent echo signals produced by each transducer 2 are applied to receiver 14. The separate echo signals from each transducer 2 are combined in receiver 14 to produce a single echo signal which is used to produce a line in an image on a display system 20.

Transmitter 12 drives transducer array 10 such that the ultrasonic energy produced is directed, or steered, in a beam. To accomplish this, transmitter 12 imparts a time delay $T_i$ to the respective pulsed waveforms 24 that are applied to successive transducers 2. By adjusting the time delays $T_i$ appropriately in a conventional manner, the ultrasonic beam can be directed away from axis 26, which is normal to array 10, by an angle θ and focused at a fixed range R. A sector scan is performed by progressively changing the time delays $T_i$ in successive excitations. The angle θ is thus changed in increments to steer the transmitted beam in a succession of directions.

The echo signals produced by each burst of ultrasonic energy reflect from objects located at successive ranges along the ultrasonic beam. The echo signals are sensed separately by each transducer 2 and a sample of the magnitude of the echo signal at a particular point in time represents the amount of reflection occurring at a specific range. Due to the differences in the propagation paths between a reflecting point P and each transducer 2, however, these echo signals will not be detected simultaneously. Receiver 14 amplifies the separate echo signals, imparts the proper time delay to each, and sums them to provide a single echo signal which accurately indicates the total ultrasonic energy reflected from point P located at range R along the ultrasonic beam oriented at the angle θ.

To simultaneously sum the electrical signals produced by the echoes impinging on each transducer 2, time delays are introduced into each one of separate transducer channels of receiver 14. The beam time delays for reception are the same delays ($T_i$) as the transmission delays described above. However, the time delay of each receiver channel continuously changes during reception of the echo to provide dynamic focusing of the received beam at the range R from which the echo signal emanates.

Under direction of digital controller 18, receiver 14 provides delays during the scan such that steering of receiver 14 tracks the direction θ of the beam steered by transmitter 12 and samples the echo signals at a succession of ranges R and provides the proper delays and phase shifts to dynamically focus at points P along the beam. Thus each emission of an ultrasonic pulse waveform results in acquisition of a series of data points which represent the amount of reflected sound from a corresponding series of points P located along the ultrasonic beam.

Display system 20 receives the series of data points produced by receiver 14 and converts the data into the desired image.

Figure 2:
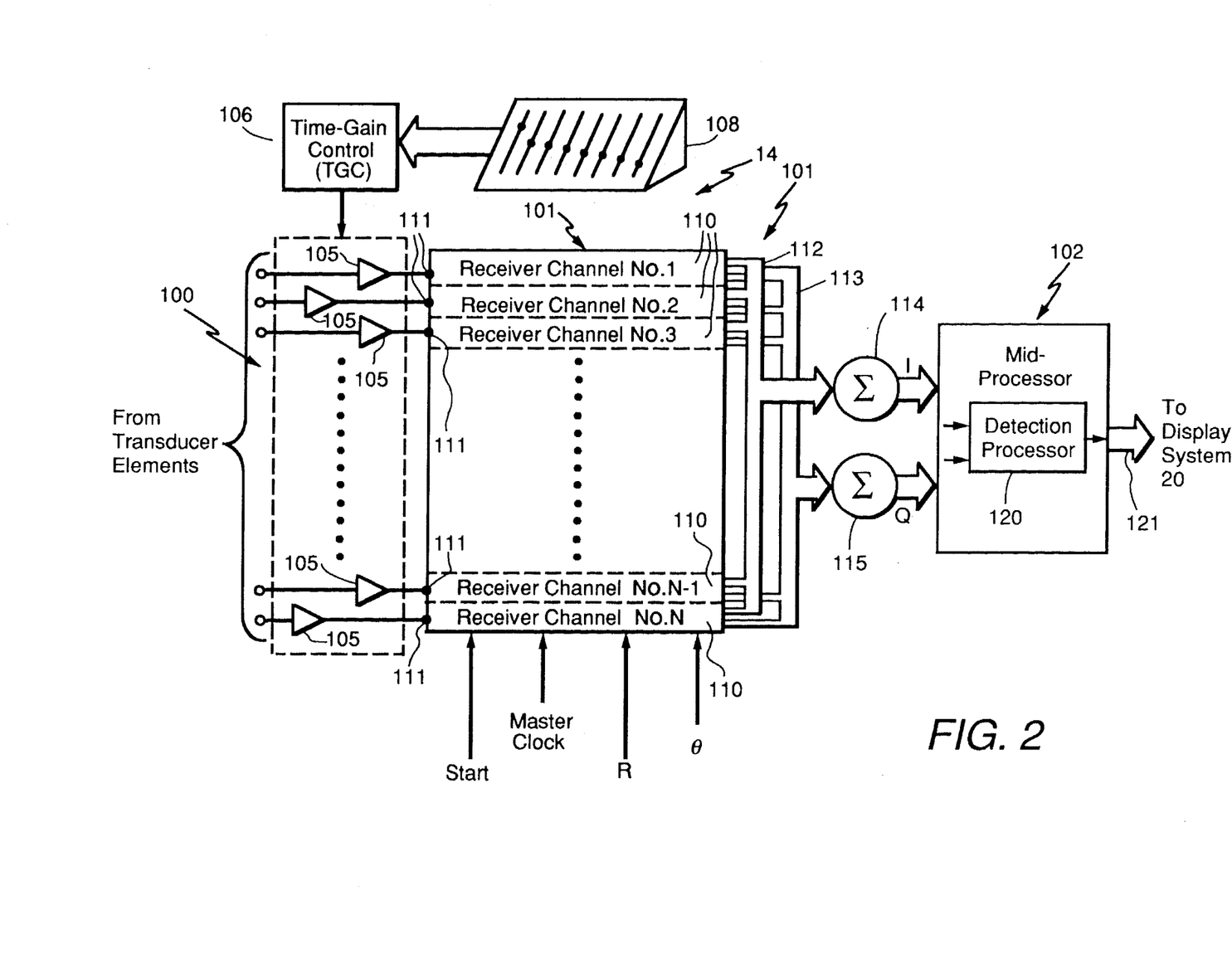
FIG. 2 is a block diagram of a conventional receiver which forms part of the system of FIG. 1.

FIG. 2 shows conventional receiver 14 as comprising three sections: a time-gain control section 100, a receive beamforming section 101 and a midprocessor 102. Time-gain control (TGC) section 100 includes a respective amplifier 105 for each of receiver channels 110 and a time-gain control circuit 106. The input of each amplifier 105 is connected to a respective one of transducers 2 (shown in FIG. 1) to amplify the echo signal which it receives. The amount of amplification provided by amplifiers 105 is controlled by TGC circuit 106 which, in turn, is set by hand operation of potentiometers 108.

The receive beamforming section 101 of receiver 14 includes separate receiver channels 110, each receiving the analog echo signal from a respective one of amplifiers 105 at an input 111. Each amplified signal is conveyed to a pair of quadrature detectors in the respective receiver channel, where the phases of the mixing reference frequency differ by 90°. Since this reference frequency is made identical to that of the transmitted pulses, output signals from low-pass filters in the receiver channel become complex signals (I and Q) with phases that differ by 90°. These signals are produced as a stream of digitized output values on an I bus 112 and a Q bus 113. Each of these I and Q signals represents a demodulated sample of the echo signal at a specific range R. These samples have been delayed such that when they are summed at summing points 114 and 115 with the I and Q samples from each of the other receiver channels 110, the summed signals indicate the magnitude and phase of the echo signal reflected from a point P located at range R on the beam steered at angle θ.

Mid-processor 102 receives the beam samples from summing points 114 and 115. The I and Q values of each beam sample are signals representing the in-phase and quadrature components of the magnitude of reflected sound from a point (R, θ). A detection processor 120 receives the summed I and Q values and produces an output signal of magnitude $|A|=(I^2+Q^2)^{1/2}$.

Figure 3:
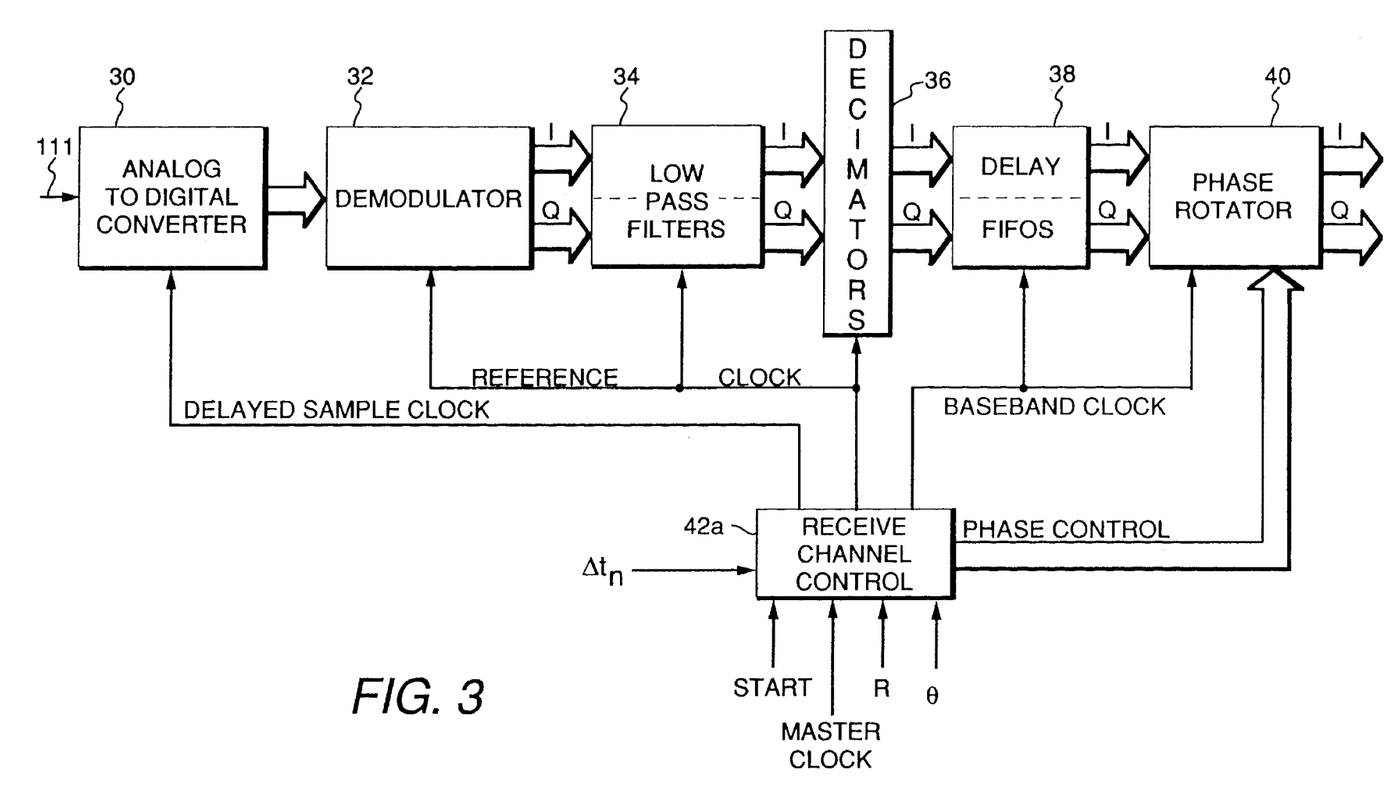
FIG. 3 is a block diagram of a conventional receiver channel which forms part of the receiver of FIG. 2.

Each receiver channel, as shown in FIG. 3, is responsive to a START command, a master clock, a beam angle signal θ and a range signal R from digital controller 18 (FIG. 1) to perform the digital beamforming functions which include: sampling the analog input signal at regular intervals in an analog-to-digital converter 30; demodulating the sampled signal in a demodulator 32; filtering out the high-frequency sum signals produced by demodulator 32 with low pass filters 34; reducing the data rate in decimators 36; and time-delaying and phase-adjusting the resulting digital data stream in delay FIFOs (i.e., first-in/first-out registers or memories) 38 and phase rotator 40, respectively. The components of the beamformer are controlled by a receive channel control 42a which produces the required clock and control signals in response to commands from digital controller 18 (FIG. 1).

Demodulator 32 mixes each sample from analog-to-digital converter 30 with a reference signal I that is in-phase and a reference signal Q that is in quadrature with the transmitted ultrasonic carrier. Low pass filters. 34 are finite impulse response (FIR) filters tuned to pass the difference frequencies, but block the higher sum frequencies, supplied by demodulator 32. The output signal of each low pass filter is a stream of digital values representing the I or Q component, respectively, of the echo signal. The rate at which the demodulated I and Q components of the echo signal are sampled is reduced by decimators 36. The echo signal represented by the demodulated and decimated digital samples is then delayed by delay FIFOs 38 and phase-shifted by phase rotator 40 to provide the desired beam steering and beam focusing.

The response of an ultrasound imaging system focused in a given direction is peaked for that direction. The response is not zero, however, for other directions. In some ultrasound images, the signal from reflections coming from a given direction is contaminated or obscured by reflections from a bright object (i.e., reflector) in a nearby direction. The ultrasound imaging system in accordance with the present invention incorporates means for adapting the response of the-system to reduce artifacts caused by such interfering reflectors.

Figure 4:
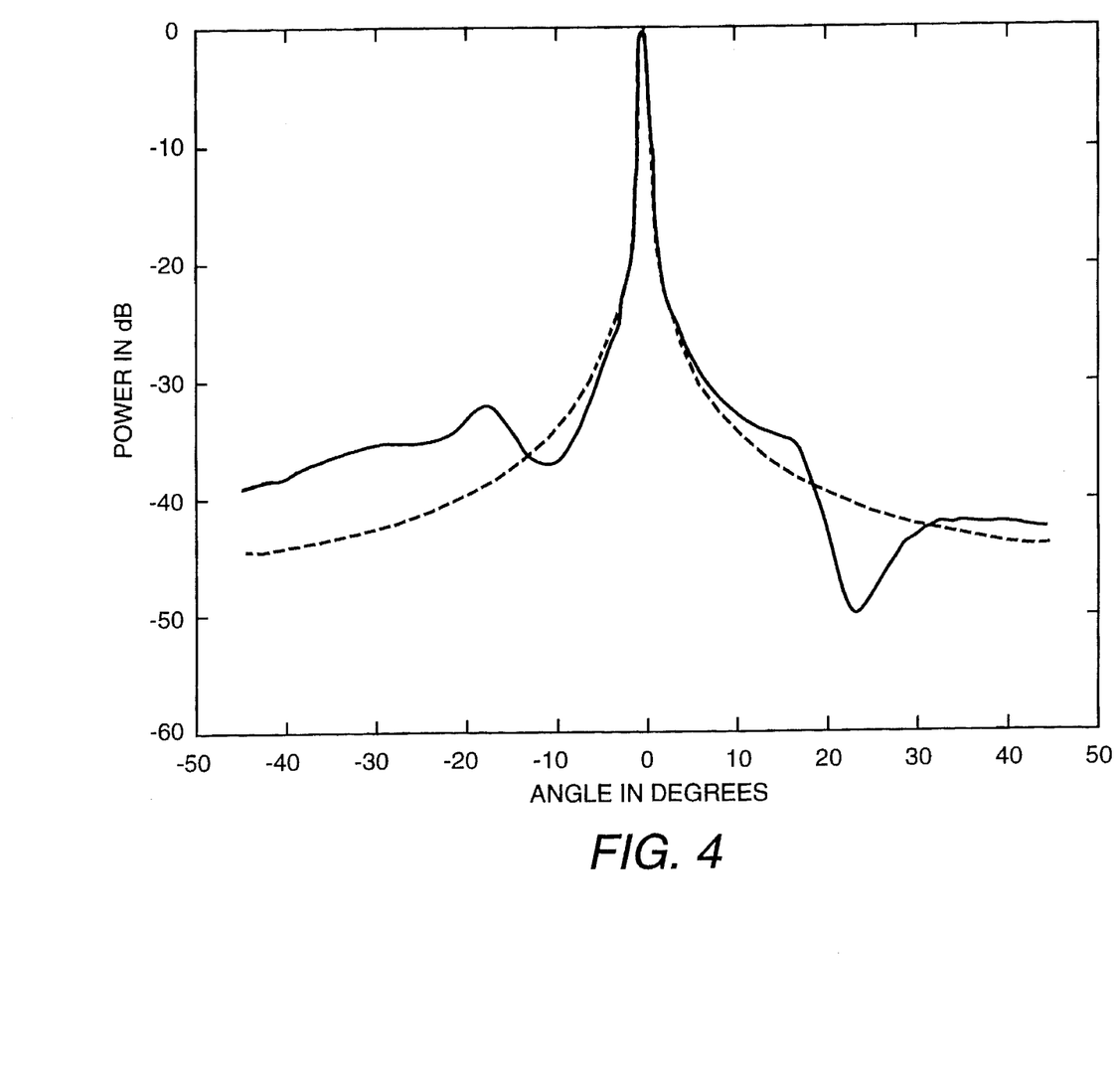
FIG. 4 is a graph of power versus steering angle showing a projected ultrasonic beam pattern before (dashed curve) and after (solid curve) null formation.

The dashed line in FIG. 4 shows the response of an ultrasound imaging system as a function of the angle of the reflected signal for a beam which is focused in the direction θ=0°. Reflected signals originating from angles near θ=0° generate a large response, which decreases for signals originating at other angles. The image formed by the ultrasound system for a given direction $\theta_n$ is formed from the sum of the reflected signals over all angles, weighted by the system angular response. Therefore, a small reflection from the direction of interest θ' can be obscured by a larger reflection from direction θ≠θ. This undesirable effect is counteracted, according to the present invention, by modifying the response of the ultrasound imaging system. This modification is achieved by adjusting both the time and phase delays which are applied to the transmitted and receive signals on each transducer element. The delays are adjusted to form a null, or notch, in the direction of the interfering signal, while retaining the large response near the desired focusing direction. The solid line in FIG. 4 represents the response of an ultrasound imaging system focused in the direction θ=0° with a null formed in the direction θ=22.5°. (The following parameters, defined hereinafter, were used in conjunction with FIG. 4: M=10, $\theta_1$=20° and $\theta_2$=25°. The center frequency $f$ of the pulse was 3.75 MHz. The transducer array consisted of 128 elements equally spaced at one-half wavelength of the center frequency. R' was made very large to simulate a reflector far from the transducers.)

In operation, the first step is to select M control angles. This selection is under operator control. Using the display screen, the operator selects a pair of angles, $\theta_1$ and $\theta_2$, and a depth R', which approximates the location of the interfering signal. The operator also selects the number of control angles M, M being typically in the range of 4 to 10.

Figure 5:
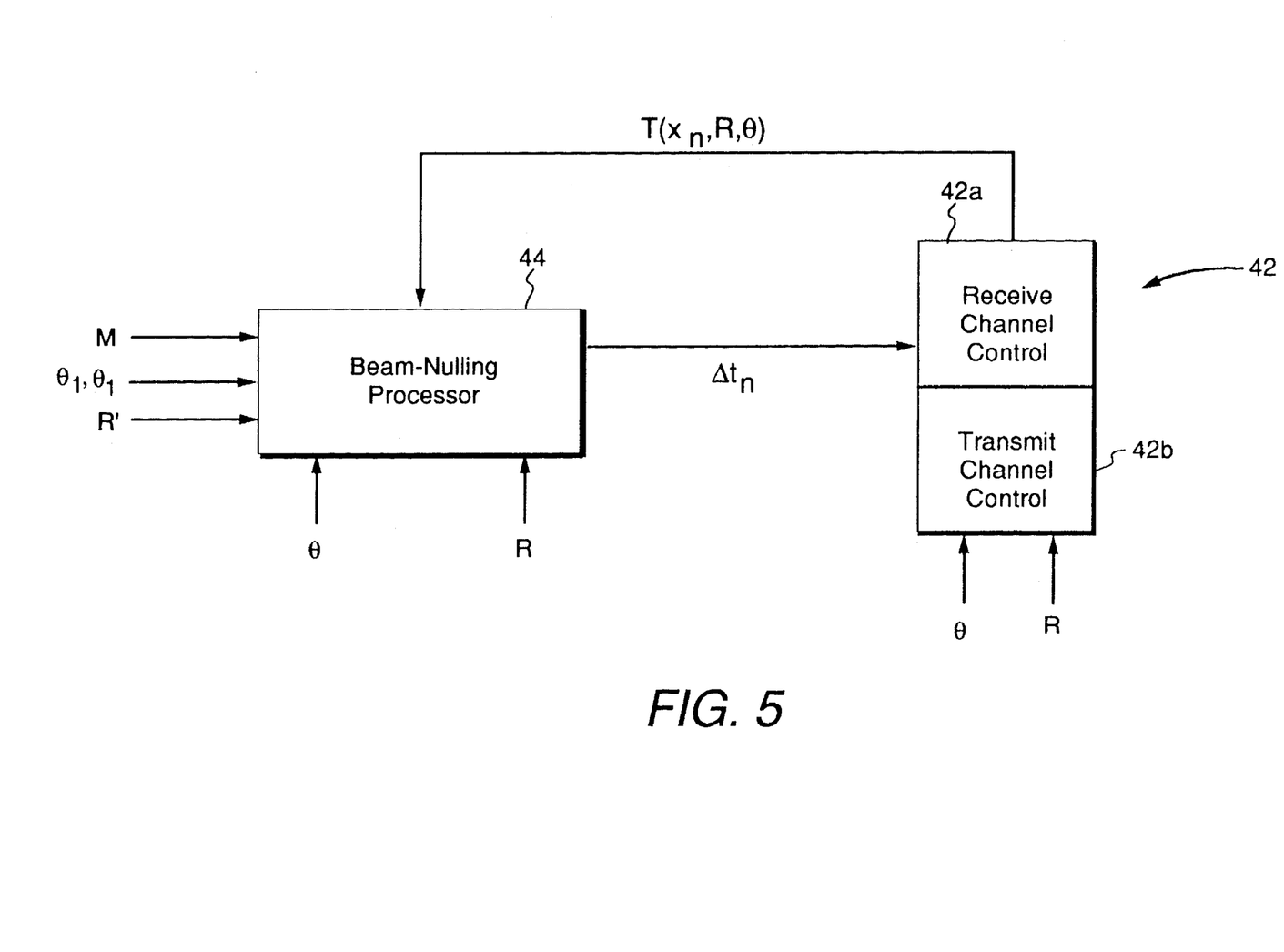
FIG. 5 is a block diagram showing how a beam-null processor is incorporated into an ultrasonic imaging system in accordance with the invention.

In accordance with the present invention, digital controller 18, shown in FIG. 1, includes therein a beam-nulling processor (shown in FIG. 5). After selection of M, the beam-nulling processor calculates a set of M evenly-spaced control angles $\theta_1, \theta_2, \ldots, \theta_M$ which span the selected region.

Next the beam-nulling processor calculates the following N×M quantities:

$$I_{nm}=a_n\sin\{2\pi f[T(x_n,R,\theta)-T(x_n, R',\theta_m')]\} \quad (1a)$$

$$R_{nm}=a_n\cos\{2\pi f[T(x_n, R,\theta)-T(x_n, R',\theta_m')]\} \quad (1b)$$

where n=1, 2, ..., N and m=1, 2, ..., M. In Eqs. (1a) and (1b), $f$ is the center frequency of the transmitted ultrasound pulse, and $x_n$ is the position of the n-th transducer element. There are a total of N transducer elements. $T(x_n, R, \theta)$ is the time delay applied to the received signal arriving at the transducer element located at $x_n$ for a beam focused in the direction θ and at depth R. $T(x_n, R', \theta_m')$ is the time delay calculated for the same transducer element for a beam focused in the direction of the control angle $\theta_m'$ and at the control depth R'. Finally, $a_n$ is the amplitude weight applied to the signal from the n-n-th element as part of the normal beamforming summation.

Next, the beam-nulling processor solves the following 2M equations for the 2M quantities $\alpha_m$ and $\beta_m$, where m and l=1, 2, ..., M:

$$\sum_{n=1}^{N} R_{nl} = \sum_{m=1}^{M}\sum_{n=1}^{N} (\alpha_m I_{nm}I_{nl} + \beta_m R_{nm}I_{nl}) \quad (2a)$$

$$\sum_{n=1}^{N} I_{nl} = \sum_{m=1}^{M}\sum_{n=1}^{N} (\alpha_m I_{nm}R_{nl} + \beta_m R_{nm}R_{nl}). \quad (2b)$$

Finally, given the quantities $\alpha_m$ and $\beta_m$, the beamnulling processor calculates the N time delay corrections, $\Delta t_1, \Delta t_2, \ldots, \Delta t_N$, using the equation $$\Delta t_n = -\frac{1}{2\pi f}\sum_{m=1}^{M}(\alpha_m I_{nm} + \beta_m R_{nm}). \quad (3)$$

The beam-nulling processor retrieves from memory the unmodified parameters for a given beam direction and depth which control the time delays applied to the signals transmitted on each transducer element and also the parameters controlling the time delays applied to the received signals from each transducer element. The N time delay corrections $\Delta t_n$ are used to modify these parameters, and the modified parameters are then used for the next transmit-receive cycle for this beam direction. The modified parameters need to be calculated for every beam direction in the image (which is apparent since Eq. (1) depends upon the beam direction).

As shown in FIG. 3, the total time delay applied to the receive signal is applied partly as a true time delay through the delayed sample clock supplied to analog-to-digital converter 30 and through the digital delay generated in FIFOs 38, and partly as a phase rotation through phase rotator 40. At receive channel control 42a, the total time delay to be applied to the signal for a given element and a given beam direction is calculated and this total time delay is divided into a true time delay and a phase rotation. When the null-generation feature of the invention is active, the correction $\Delta t_n$ is added to the total time delay for element n before the calculated total time delay is divided into the true time delay and phase rotation.

The same correction $\Delta t_n$ is subtracted from the time delay calculated for the transmitted signal for element n for the given beam. In this way a null is formed in the desired direction for both the transmitted beam and the received beam response.

FIG. 5 is a block diagram of a beam-nulling processor 44 and a receive and transmit channel control 42 comprising receive channel control 42a and a transmit channel control 42b, all of which are part of digital controller 18 shown in FIG. 1. Beamnulling processor 44 receives from the digital controller operator-selected parameters M, $\theta_1$, $\theta_2$ and R', as well as the beam parameters $\theta$ and R. Processor 44 also receives the total time delay $T(x_n, R, \theta)$ for the n-th channel from receive and transmit channel control 42. From these parameters, the beam-nulling processor calculates the time delay correction $\Delta t_n$ which is sent to the receive and transmit channel control where this value is used to adjust the transmit and receive delays for the n-th channel.

Those skilled in the art of digital beam forming will be able to derive Eqs. (1a), (1b), (2a), (2b) and (3) from the details of analysis set forth hereinafter.

Consider the point-spread function for a beamformer with N elements:

$$g(R,\theta;R',\theta') = \sum_{n=1}^{N} a_n e^{j\phi_n} e^{j\omega\tau_n}. \qquad (4)$$

In equation (4), $\tau_n = T_n' - T_n$; $T_n' = T(x_n, R', \theta')$; $T_n = T(x_n, R, \theta)$; $\omega = 2\pi f$ with $f$ equal to the center frequency; $x_n$ is the location of the n-th element; and $a_n$ is the weight of the n-th element. $T_n$ is the time delay applied to the n-th element to focus the beamformer in a given direction $(R,\theta)$; $T_n'$ is the actual arrival time at the n-th element of a signal reflected from an object at $(R', \theta')$; and $\phi_n = 2\pi f \Delta t_n$, where $\Delta t_n$ is the correction to the time delay $T_n$ which will form a null in the desired direction.

Furthermore, it can be shown that $$\frac{d\tau_n}{\tau_n} = -\frac{d\omega}{\omega}.$$

At a large distance from the transducer, the time delay across the channels varies linearly across the array. A change in frequency then corresponds to a corresponding change in slope of the time delay, leading to a shift in the focusing direction. In other words, a shift in frequency is equivalent to a shift in the null direction. This means that the null which is calculated for the center frequency will be smeared out (and made shallower) when applied to a broadband signal. However, this smearing can be compensated for by originally choosing a wide null.

It is assumed that $\phi_n$ is small, i.e., $$e^{j\phi_n} \approx 1 + j\phi_n. \qquad (5)$$

Hence from Eq. (4):

$$g(\theta) = g_0(\theta) + \sum_{n=1}^{N} \phi_n a_n e^{j\omega\tau_n} \qquad (6)$$

where we denote the unperturbed point spread function as $g_0(R,\theta)$. The unperturbed point spread function is given by:

$$g_0(\theta) = \sum_{n=1}^{N} a_n e^{j\omega\tau_n} \qquad (7)$$

with weights $a_n$ for side-lobe tailoring.

For analysis the following vectors are defined;

$$\bar{C} = [a_1 e^{j\omega\tau_1}, a_N e^{j\omega\tau_2}, \ldots, a_n e^{j\omega\tau_N}], \ (N\times 1)\ vector \qquad (8)$$

or at the null locations (or control angles):

$$\bar{C}_m = [C_{1m}, C_{2m}, C_{3m}, \ldots, C_{Nm}], \ (N\times 1)M\ vector. \qquad (9)$$

The real and imaginary parts of the above vector, denoted by $R_m$ and $I_m$, have components represented by Eqs. (1a) and (1b).

The unknown phase vector is:

$$\bar{\Phi} = [\phi_1, \phi_2, \phi_3, \ldots, \phi_N], \ (N\times 1)\ vector. \qquad (10)$$

To reduce artifacts in the ultrasound image, broad nulls are formed at the central frequency with M control angles spaced a predetermined angle apart. At the locations of the nulls it is required that $$g(\theta_m) = 0 \qquad (11)$$

where m=1, ..., M.

Evaluation of Eq. (11) at the M null control angles results in the following equation:

$$0 = g_0(\theta_m) + j \sum_{n=1}^{N} \phi_n a_n e^{j\omega\tau_{nm}} \qquad (12)$$

Where $\tau_{nm}$ are computed for element location at $x_n$ at control points $\theta_m$. Separating real parts and imaginary parts, using the vector definitions, Eq. (12) reduces to:

$$(\bar{\phi}, \bar{I}_m) = (\bar{II}, \bar{R}_m) \qquad (13)$$

and $$(\bar{\phi}, \bar{R}_m) = -(\bar{II}, \bar{I}_m) \qquad (14)$$

for m=1, ..., M. II represents a unit vector and the parentheses represent the inner product.

The inner product is defined as:

$$(\bar{A}, \bar{B}) = \sum_{n=1}^{N} a_n b_n$$

where $$\bar{A} = [a_1, a_2, \ldots, a_N]$$

and $$\bar{B} = [b_1, b_2, \ldots, b_N].$$

A quadratic functional obtained from the inner product of a phase vector $\psi$ in the neighborhood of $\phi$ corresponds to minimization of the square of the norm of ø, incorporating constraints with the help of Lagrange's multipliers.

$$P = \frac{1}{2} (\overline{\psi}, \overline{\psi}) - \sum_{m=1}^{M} \alpha_m[(\overline{\psi}, \overline{I}_m) - (\overline{\Pi}, \overline{R}_m)] - \quad (15)$$

$$\sum_{m=1}^{M} \beta_m[(\overline{\psi}, \overline{R}_m) + (\overline{\Pi}, \overline{I}_m)]$$

where $$\overline{\Psi} = [\psi_1, \psi_2, \ldots, \psi_N].$$

Taking the stationary value of P around $$\overline{\Psi} = \overline{\Phi}$$

results in $$\frac{\partial P}{\partial \psi_n} = 0 = \psi_n - \sum_{m=1}^{M} \alpha_m I_{nm} - \sum_{m=1}^{M} \beta_m R_{nm}, \quad (16)$$

or evaluating the above at $$\overline{\Psi} = \overline{\Phi}$$

results in $$\overline{\Phi} = \sum_{m=1}^{M} [\alpha_m \overline{I}_m + \beta_m \overline{R}_m]. \quad (17)$$

With the identity $\Delta t_n = \phi_n/2\pi f$, Eq. (17) is the same as Eq. (3).

This result of Eq. (17) is similar to that described by Steyskal in "Simple Method for Phase Nulling by Phase Perturbation" IEEE Transactions on Antennas and Propagation, Vol. AP-31, No. 1, January 1983, pp. 163–166, where it was assumed that the g(θ) is real. The present invention is not based on such an assumption. The solution disclosed by Chakraborty et al., "Beam Shaping Using Nonlinear Phase Distribution in a Uniformly Spaced Array", IEEE Transactions on Antennas and Propagation, Vol. AP-30, No. 5, September 1982, pp. 1031–1035, was obtained using the orthogonality property as well as matrix identities based on the positive definiteness of the matrices as given by Bellman, "Introduction to Matrix Analysis", 2nd Ed., 1970 McGraw Hill Book Company, New York. In the present case, Lagrange's method gives the general solution in an easy manner and at the same time has the property of making the norm of the phase vector stationary. To obtain ($\alpha_m$ and $\beta_m$, Eq. (17) is substituted into Eqs. (13) and (14) to arrive at:

$$(\overline{\Pi}, \overline{R}_l) = \sum_{m=1}^{M} \alpha_m(\overline{I}_m, \overline{I}_l) + \sum_{m=1}^{M} \beta_m(\overline{R}_m, \overline{I}_l) \quad (18)$$

and $$(\overline{\Pi}, \overline{I}_l) = \sum_{m=1}^{M} \alpha_m(\overline{I}_m, \overline{R}_l) + \sum_{m=1}^{M} \beta_m(\overline{R}_m, \overline{R}_l), \quad (19)$$

where $l = 1, 2, \ldots, M$.

Equations (18) and (19), in vector form, are the same as Eqs. (2a) and (2b). It is seen from Eqs. (18) and (19) as well as Eqs. (2a) and (2b) that the problem only requires solution of a system having 2M equations, where M can be much less than N, the number of elements in the main array. This reduces the complexity of the solution and can be easily implemented in real time.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for reducing, in a digital imaging system, magnitude of an artifact in an ultrasound image caused by a highly reflective region outside a region of interest, comprising the steps of:

activating the elements of a transducer array using uncorrected transmit time delays which focus transmitted ultrasound beams in the region of interest located at a predetermined angle and at a predetermined range;

forming receive beams from the reflected ultrasound received by said transducer elements using uncorrected receive time delays which focus the receive beams in the region of interest;

displaying an image of the region of interest wherein said image contains an artifact resulting from a source of interference at an angle and range that correspond to a location outside the region of interest;

selecting parameters which approximate the angle and range of the source of interference;

computing time delay corrections which form a null in a region including the approximate location of the source of interference based on the selected parameters;

computing corrected transmit time delays as a function of said time delay corrections and said uncorrected transmit time delays;

computing corrected receive time delays as a function of said time delay corrections and said uncorrected receive time delays;

activating said transducer elements using said corrected transmit time delays;

forming receive beams from the reflected ultrasound received by said transducer elements using said corrected receive time delays; and displaying an image of the region of interest derived from said receive beams formed using said corrected receive time delays so as to reduce prominence of the artifact resulting from the source of interference.

2. The method as defined in claim 1 including the step of calculating a respective corrected time delay for each element in the transducer array.

3. The method as defined in claim 1 including the step of calculating a respective corrected time delay for every beam direction in the image.

4. The method as defined in claim 1 including the step of perturbing the time delay in each of a multiplicity of receive channels so as to implement, in part, said corrected receive time delays.

5. The method as defined in claim 1 including the step of perturbing the time delay in each of a multiplicity of transmit channels so as to implement, in part, said corrected transmit time delays.

6. An ultrasound imaging system comprising:

an array of transducer elements;

means for activating said transducer elements to transmit a beam which is focused in a region of interest;

a multiplicity of receive channels connected to said transducer elements for receiving signals representing amplitude of reflected ultrasound received by said transducer elements and for forming beams from the received signals;

receive channel control means for controlling of time delays during beamforming by said receive channels;

digital control means for determining time delays to be supplied to said receive channel control means for forming beams to be focused in the region of interest, said digital control means including beam-null processing means for calculating time delay corrections which form a null in a region, outside the region of interest, which includes the approximate location of a source of interference; and display means for displaying an image derived from said formed beams.

7. The ultrasound imaging system as defined in claim 6 including means for calculating a respective time delay correction for each element in the transducer array.

8. The ultrasound imaging system as defined in claim 6 wherein said receive channel control means is adapted to calculate a corrected receive time delay as a function of each respective time delay correction.

9. The ultrasound imaging system as defined in claim 6 including means for perturbing the time delay in each of said receive channels in order to implement, at least in part, said corrected receive time delays.

10. The ultrasound imaging system as defined in claim 6 wherein said transmit channel control means is adapted to calculate a corrected transmit time delay as a function of each respective time delay correction.

11. The ultrasound imaging system as defined in claim 6 including means for perturbing the time delay in each of said transmit channels in order to implement, at least in part, said corrected transmit time delays.

* * * * *